UNITED STATES PATENT OFFICE.

ANGELO SIMONINI, OF ATLANTIC CITY, NEW JERSEY, ASSIGNOR TO WELSBACH LIGHT COMPANY, A CORPORATION OF NEW JERSEY.

MANUFACTURE OF INCANDESCENT GAS-MANTLES.

936,177.  Specification of Letters Patent.  Patented Oct. 5, 1909.

No Drawing.  Application filed April 15, 1908.  Serial No. 427,219.

*To all whom it may concern:*

Be it known that I, ANGELO SIMONINI, a subject of the Emperor of Austria-Hungary, and a resident of Atlantic City, county of Atlantic, State of New Jersey, have invented certain new and useful Improvements in Manufacture of Incandescent Gas-Mantles; and I do hereby declare the following to be a full, clear, and exact description of the invention, such as will enable others skilled in the art to which it appertains to make and use the same.

The invention relates to certain new and useful improvements in the manufacture of incandescing gas mantles, and particularly to the manufacture of such mantles from artificial silk webbing. The resultant product possesses physical qualities which particularly adapt it to use as a gas incandescent in a Bunsen flame; as, for instance, increased resistance to the explosive action of the gas and air mixture at the time of ignition, capability of withstanding very considerable shocks and jars, and even of suffering radical bends or flexures and thereafter permitting it to resume its original form of configuration without breaking. It is, furthermore, characteristic of the product that it maintains practically its lighting efficiency and physical properties during long continued use.

In carrying out the invention, the artificial silk webbing, preferably of the usual tubular configuration and close mesh familiar to the art, is first subjected to a preliminary washing and purifying treatment before the action of the saturating fluid. To this end, I preferably bleach the webbing and thereafter treat it with a very dilute solution of hydrochloric acid for the purpose of dissolving out the mineral impurities, and then after thoroughly washing it with distilled water, neutralize it to remove the last traces of the acid. I then carefully dry the webbing. The purified and dried webbing is then subjected to the action of a saturating solution of lighting fluid made up of the nitrates of thorium and cerium in the usual proportions, familiar to the art. After the saturation the excess of the lighting fluid is removed, by centrifugalizing, squeezing, or the like, and the webbing is thereupon dried. The dried webbing is then treated with a solution of alkali preferably ammonia for the purpose of fixing in the fabric the mineral constituents of the lighting fluid in the form of amorphous insoluble compounds. The soluble constituents are thereupon removed by washing and the webbing is preferably again dried. A solution is then prepared of approximately two parts, by weight, of ammonium persulfate crystals dissolved in seven parts by weight of a pure solution of hydrogen peroxid of the usual commercial strength. The webbing is steeped in the resultant solution and is then washed and dried. As in the usual practice of making incandescent gas mantles, the webbing is thereupon looped together at the top for suspension, the organic matter is burned out and the residual ash is incinerated in an intensified gas flame, as will be readily understood. The incinerated mantle may then be dipped in collodion and is ready to be packed in boxes for the market.

The artificial silk webbing which I prefer to employ in producing the mantle is that made either from denitrated nitro-cellulose or from cupro ammonia cellulose.

What I claim is:

1. The method of making incandescent gas mantles from artificial silk webbing, which consists in subjecting the artificial silk webbing, saturated with lighting salts to the action of ammonia and to the action of peroxid of hydrogen; substantially as described.

2. The method of making incandescent gas mantles from artificial silk webbing, which consists in dipping the artificial silk webbing saturated with lighting salts, first in ammonia, and subsequently in a solution containing peroxid of hydrogen; substantially as described.

3. The method of making incandescent gas mantles from artificial silk webbing, which consists in dipping the artificial silk webbing, saturated with lighting salts, first in ammonia, and subsequently in a solution containing peroxid of hydrogen; substantially as described.

4. The method of making incandescent gas mantles from artificial silk webbing, which consists in dipping the artificial silk webbing, saturated with lighting salts, first in ammonia, then rinsing it, and then dipping it in the solution containing hydrogen peroxid and ammonia persulfate.

I testimony whereof I affix my signature, in presence of witnesses.

ANGELO SIMONINI.

Witnesses:
RAYMOND ADAMS,
J. BYRON ROGERS,
LEMUEL E. CONOVER.